United States Patent
Creasey et al.

(10) Patent No.: US 11,766,052 B2
(45) Date of Patent: Sep. 26, 2023

(54) DOMESTIC ANIMAL WATER AND FEED MODIFYING COMPOSITIONS

(71) Applicant: ITI Technologies, Inc., Leland, NC (US)

(72) Inventors: David H. Creasey, Leland, NC (US); Samuel Horace McCall, IV, Leland, NC (US)

(73) Assignee: ITI Technologies, Inc., Leland, NC (US)

(*) Notice: Subject to any disclaimer, the term of this patent is extended or adjusted under 35 U.S.C. 154(b) by 0 days.

(21) Appl. No.: 17/874,467

(22) Filed: Jul. 27, 2022

(65) Prior Publication Data

US 2022/0361527 A1 Nov. 17, 2022

Related U.S. Application Data

(63) Continuation of application No. 16/784,056, filed on Feb. 6, 2020, now Pat. No. 11,432,569.

(60) Provisional application No. 62/928,386, filed on Oct. 31, 2019.

(51) Int. Cl.
| | |
|---|---|
| A23K 20/163 | (2016.01) |
| A23K 50/75 | (2016.01) |
| A23K 20/105 | (2016.01) |
| A23K 20/20 | (2016.01) |

(52) U.S. Cl.
CPC .......... *A23K 20/163* (2016.05); *A23K 20/105* (2016.05); *A23K 20/30* (2016.05); *A23K 50/75* (2016.05)

(58) Field of Classification Search
CPC .................................................. A23K 20/163
See application file for complete search history.

(56) References Cited

U.S. PATENT DOCUMENTS

| | | | |
|---|---|---|---|
| 5,989,595 | A | 11/1999 | Cummins |
| 7,192,618 | B2 | 3/2007 | Cummins |
| RE41,109 | E | 2/2010 | Cummins |
| 8,012,511 | B1 | 4/2011 | Cummins |
| 8,691,285 | B2 | 4/2014 | Cummins |
| 10,264,793 | B2 | 4/2019 | Meccia |
| 10,662,093 | B2 | 5/2020 | Nicholas |
| 2002/0065198 | A1 | 5/2002 | Highsmith |

(Continued)

FOREIGN PATENT DOCUMENTS

EP 1604657 A1 12/2005

OTHER PUBLICATIONS

Mani-Lopez et al., Organic acids as antimicrobials to control Salmonella in meat and poultry products, Food Research International, 45, 2012, pp. 713-721. (Year: 2012).

(Continued)

*Primary Examiner* — Elizabeth Gwartney
(74) *Attorney, Agent, or Firm* — Steven A. Fontana; Maynard Nexsen PC; E. Eric Mills

(57) ABSTRACT

The present invention provides domestic animal water modifying compositions, domestic animal water modifying compositions with copper, domestic animal water modifying compositions with silver and domestic animal feed modifying compositions. Such compositions are provided to domestic animals to provide, for example, improved weight gain, decreased mortality, improved feed conversion rations, improved overall health and reductions in grow-out periods for domestic animals to which such compositions are administered.

5 Claims, 6 Drawing Sheets

(56) References Cited

U.S. PATENT DOCUMENTS

2017/0280728 A1  10/2017  Dautreiul

OTHER PUBLICATIONS

Rhys et al., "On the structure of an aqueous propylene glycol solution," J. Chem. Phys. 145 (22), Dec. 2016, pp. 1-12. (Year: 2016).

Nalawade et al. J Int. Soc Prev Community Dent. vol. 5(2), pp. 114-118 Mar.-Apr. 2015. (Year: 2015).

DOMESTIC ANIMAL WATER AND FEED MODIFYING COMPOSITIONS

CROSS-REFERENCE TO RELATED APPLICATIONS

This application is a continuation and claims priority to U.S. patent application Ser. No. 16/784,056 filed Feb. 6, 2020, which is related and claims priority to U.S. Provisional Patent Application No. 62/928,386 entitled "Domestic Animal Water and Feed Modifying Compositions" filed on Oct. 31, 2019; the entire disclosure of which is incorporated herein by reference.

BACKGROUND

A multitude of factors influence successful husbandry of domestic animals including, for example and without limitation, feed quality, nutrient balance, feed availability, water quality, environmental factors and the overall health of each animal. Growers frequently consider feed conversion, measured by the feed conversion ratio, to be one of the more important factors for commercial success. The better the feed conversion ratio, the less feed is required per pound of animal weight gain. Animal feed is one of the most expensive elements of animal husbandry. Less feed per pound of animal weight gain has a net positive impact on a grower's financials. Similarly, reducing the incidence of animal mortality is imperative in any animal husbandry operation. Generally, informed growers look at every aspect of optimal production while valuing the overall health of the animals.

Of the many factors that contribute to the overall health and sustained growth of domestic animals, water quality, water additives and feed additives can be significant contributors that can influence digestion, feed conversion ratio, weight gain, gut health, disease incidence and among other factors, survivability. The present disclosure describes certain water and feed additives that contribute to the overall health of domestic animals, including livestock.

SUMMARY

Brief Description of the Drawings

Features of the present invention will be more fully appreciated by reference to the following detailed description when taken in conjunction with the following drawings in which.

Figure 1:
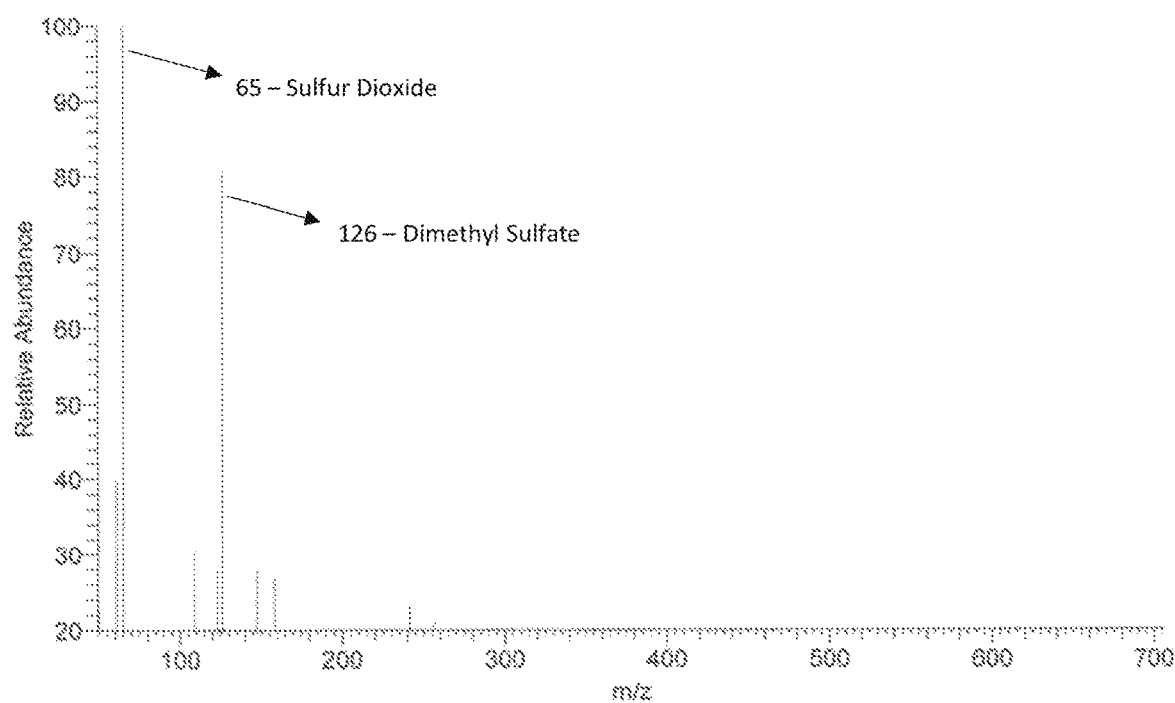
FIG. 1. depicts a low resolution spectrogram with 1 part reaction unit to 5 parts total.
Figure 2:
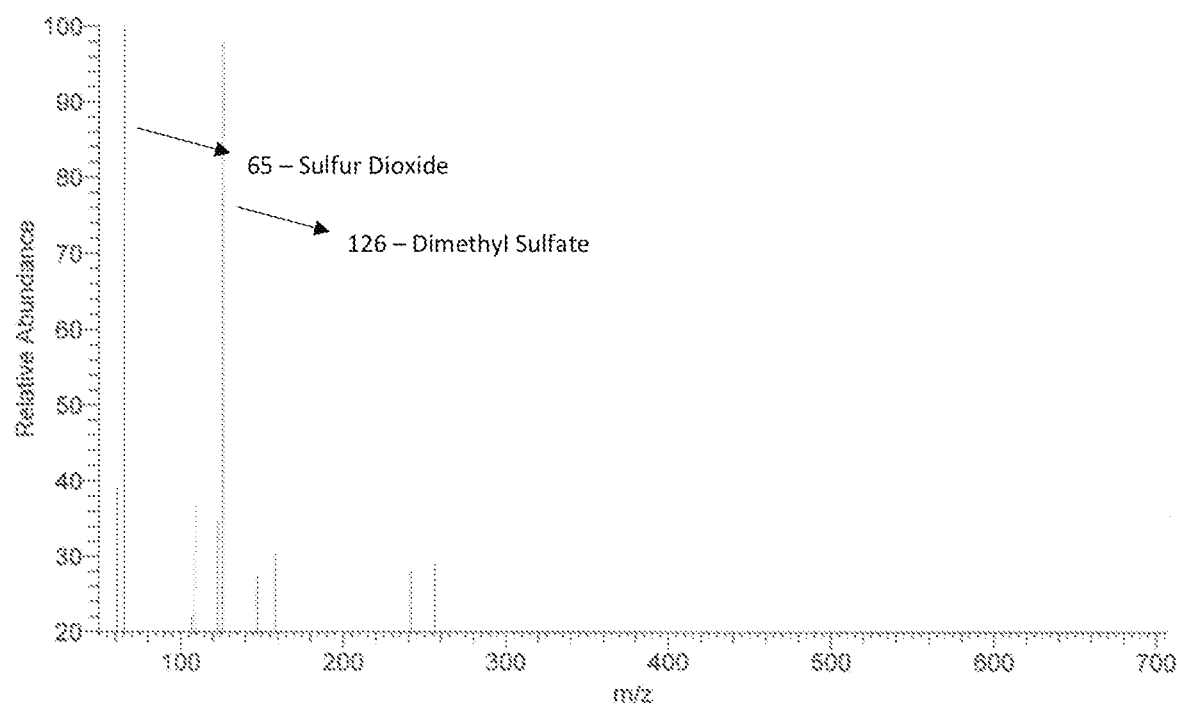
FIG. 2. depicts a high resolution spectrogram with 1 part reaction unit to 5 parts total.
Figure 3:
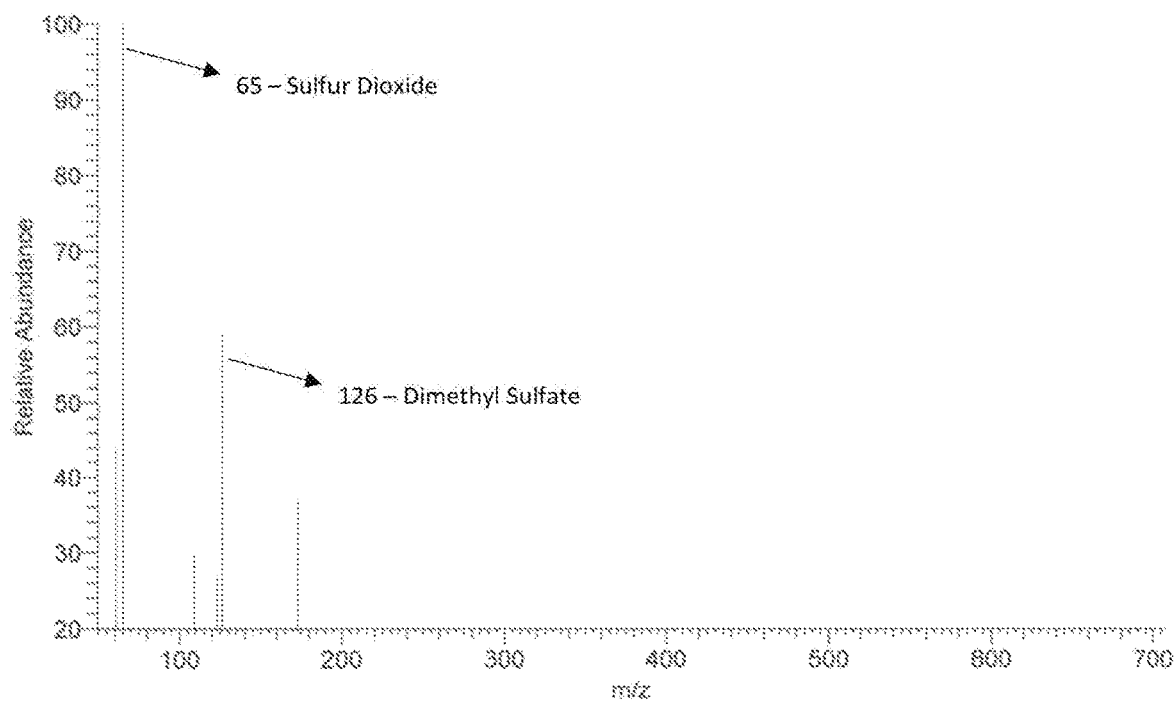
FIG. 3. depicts a low resolution spectrogram with 1 part reaction unit to 10 parts total.
Figure 4:
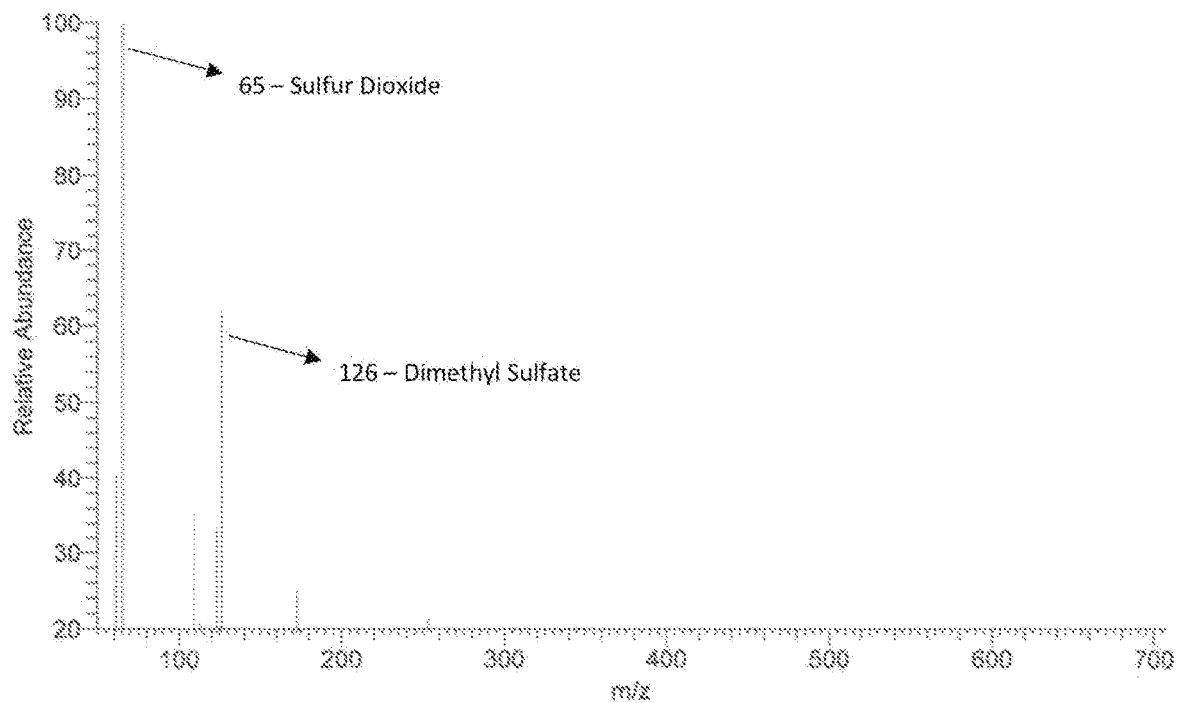
FIG. 4. depicts a high resolution spectrogram with 1 part reaction unit to 10 parts total.
Figure 5:
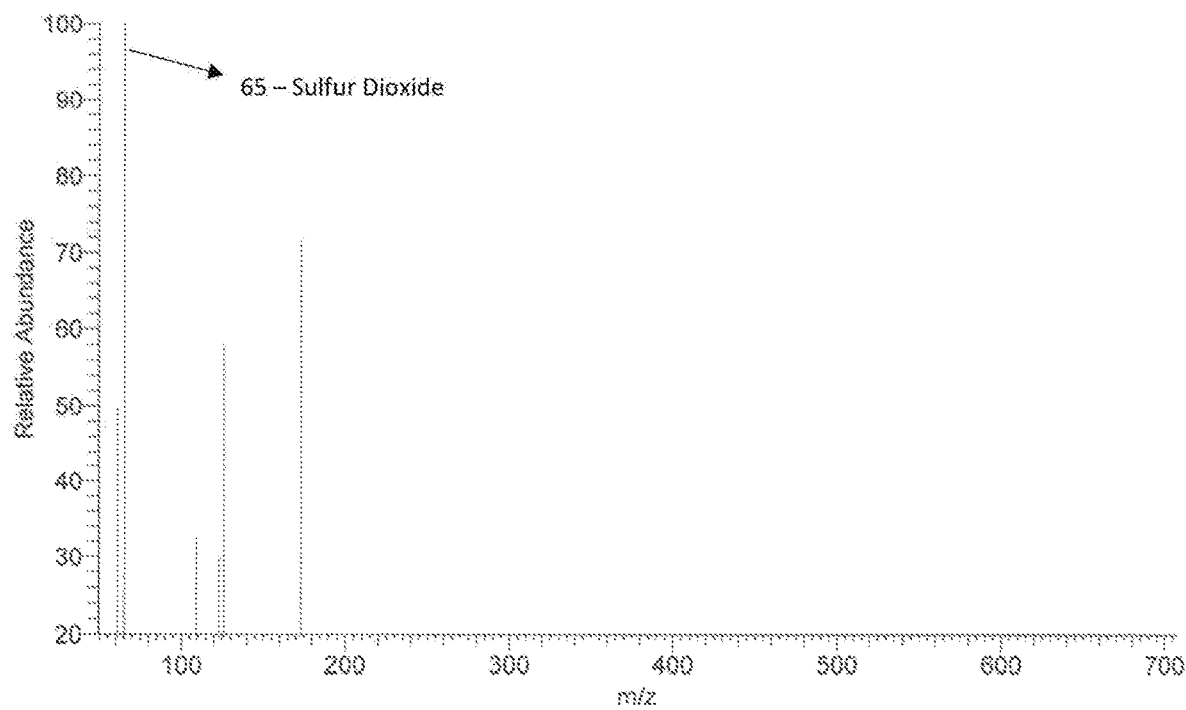
FIG. 5. depicts a low resolution spectrogram with 1 part reaction unit to 20 parts total.
Figure 6:
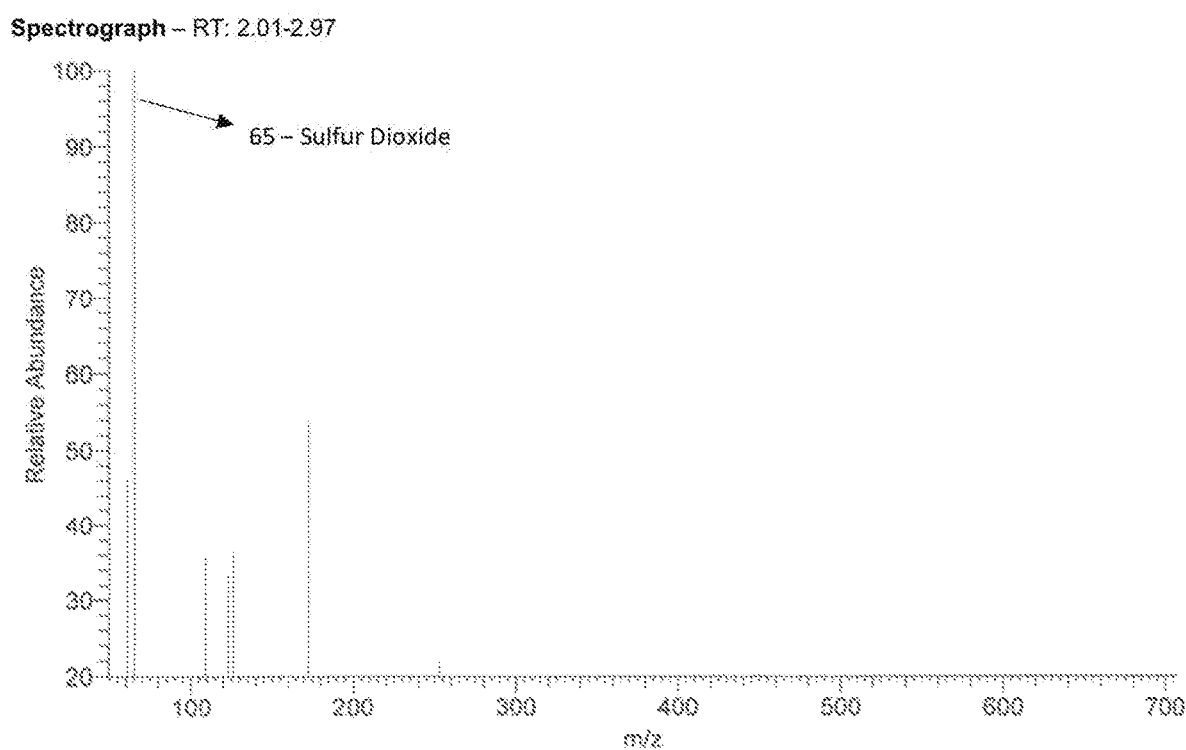
FIG. 6. depicts a high resolution spectrogram with 1 part reaction unit to 20 parts total.

Each of the spectrograms was run according to the respective teachings of Example 5. Each of the spectrograms depicts compositions that are free of salt crystals or other solids formed from the ammonium sulfate and sulfuric acid reactants.

While this disclosure is susceptible to various modifications and alternative forms, specific embodiments thereof are shown by way of example in the drawings and will herein be described in detail. It should be understood, however, that the drawings and detailed description are not intended to limit the disclosure to the particular forms illustrated but, on the contrary, the intention is to cover all modifications, equivalents and alternatives falling within the spirit and scope of the present disclosure as defined by the appended claims. The headings used herein are used for organizational purposes only and are not meant to limit the scope of the description. As used throughout this application, the word "may" is used in a permissive sense, meaning: "having the potential to"; rather than the mandatory sense meaning: "must". Similarly, the words "include", "including" and "includes" means including, without limitation. Additionally, as used in this specification and the appended claims, the singular forms "a", "an" and "the" include singular and plural referents unless the content clearly dictates otherwise.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combinations of features. In particular, with reference to the appended claims, features from dependent claims may be combined with those of independent claims and features from respective independent claims may be combined in any appropriate manner and not merely in the specific combinations enumerated in the appended claims.

One aspect of the present invention provides water pH adjusting compositions, particularly for use with domestic animals, as further described herein.

Another aspect of the present invention provides a domestic animal water modifying composition as further described herein.

An additional aspect of the present invention provides a domestic animal water modifying composition with copper as further described herein.

A further aspect of the present invention provides a domestic animal water modifying composition with silver as further described herein.

Another aspect of the present invention provides any domestic animal feed modifying composition described herein that is added to, applied to and/or blended with animal feed and/or other substances typically ingested by domestic animals and are referred to herein as domestic animal feed modifying compositions.

Additional aspects of the present invention provide for methods of using the various compositions of the present invention alone or in combination with other compositions described herein for beneficial use in domestic animal husbandry.

DETAILED DESCRIPTION

Definitions

The term "domestic animal" means any an animal that has been tamed and kept by humans as a work animal, food source or pet, especially a member of those species that have, through selective breeding, become notably different from their wild ancestors. Such domestic animals include, without limitation, cattle, poultry (hereinafter defined) and swine (hereinafter "livestock").

The term "domestic animal feed modifying compositions" means at least one domestic animal water modifying composition described herein that is added to, applied to and/or blended with domestic animal feed or other substances fed to domestic animals to aid in increasing, sustaining and/or improving domestic animal growth and/or health.

The term "domestic animal water modifying composition" means at least one domestic animal water modifying composition as described herein below.

The term "domestic animal water modifying composition with copper" means at least one domestic animal water modifying composition with copper as described herein below.

The term "domestic animal water modifying composition with silver" means at least one domestic animal water modifying composition with silver as described herein below.

The term "feed conversion ratio" means a measure of an animal's efficiency in converting feed mass into increased body mass. More specifically, the mass of the food eaten is divided by the body mass gain, over a specific period of time. A lower feed conversion ratio indicates a lesser amount of feed is required to produce a higher weight of the respective animal(s). A lower feed conversion ratio is therefore desirable.

The term "first solution" means a solution of ammonium sulfate and sulfuric acid as further described herein and used in preparing a solubility enhancing aqueous composition.

The term "free of solids" means that the solubility enhancing aqueous compositions do not form salt crystals or other solids that remain in the respective composition over time. The addition of materials not an element of the solubility enhancing aqueous compositions in the preparation of compositions of the present invention may affect the amount of salts and/or other solids. As such, the term "free of solids" pertains only to the solubility enhancing aqueous compositions described herein.

The term "grower" means an individual practicing any one of the agricultural arts including, without limitation, the growth and production of domestic animals for food.

The term "medicator" means any one of a variety of designs of agricultural equipment used to accurately provide a desired amount of a variety of materials into a water stream used for providing water to domestic animals and/or used to accurately provide a desired amount of at least one of a variety of materials, via an aqueous spray, stream or the like, to a feed or other solid material fed to domestic animals. Such materials can include, without limitation, supplements, vitamins, antibiotics and nutrients.

The term "non-toxic amount" has the meaning attributed by veterinarians for supplements and additives administered to domestic animals that do not have a lasting deleterious effect on the overall health of such animals.

The term "poultry" means domesticated birds raised for their eggs, meat, leather or feathers including, without limitation, chickens, domesticated ducks, emu, geese, Indian peafowl, Mute swan, ostrich, turkeys, domesticated guineafowl, common pheasant, golden pheasant and rhea.

The term "reaction unit" relative to the preparation of a solubility enhancing aqueous composition means the desired total volume of a first solution as expressed as a ratio of a range of ammonium sulfate concentrations to sulfuric acid concentrations (the reactants).

The term "second solution" means the first solution as prepared for a final volume plus the requisite amount of water to form a solubility enhancing aqueous composition as further described herein.

The term "solubility enhancing aqueous composition" means at least one solubility enhancing aqueous compositions as described herein below.

The term "sulfate anions" encompasses each of sulfate anions, bisulfate anions and combinations thereof. Combinations of sulfate anions and bisulfate anions are common in the solubility enhancing aqueous compositions described herein.

The term "sulfuric acid" means concentrated sulfuric acid having a concentration of from about 95% to about 98%.

The term "substantially free of solids" means that the solubility enhancing aqueous compositions described herein are at least 95 percent aqueous or, alternatively, at least 98 percent aqueous without the formation of salt crystals or other solids. The addition of materials not an element of the solubility enhancing aqueous compositions in the preparation of compositions of the present invention may affect the amount of salts and/or other solids. As such, the term "substantially free of solids" pertains only to the preparations of each of the solubility enhancing aqueous compositions described herein.

The term "water pH adjusting composition" means one or more pH adjusting composition as described herein below.

Description

The following description and examples are included to demonstrate the embodiments of the present disclosure. It should be appreciated by those of skill in the art that the compositions, techniques and methods disclosed in the examples herein function in the practice of the disclosed embodiments. However, those skilled in the respective arts should, in light of the present disclosure, appreciate that changes can be made to the specific embodiments and still obtain a like or similar result without departing from the spirit and scope of the disclosed embodiments.

The present specification includes references to "one aspect/embodiment" or "an aspect/embodiment". These phrases do not necessarily refer to the same embodiment although embodiments that include any combination of the features or elements disclosed herein are generally contemplated unless expressly disclaimed herein. Particular features, processes, elements or characteristics may be combined in any suitable manner consistent with this disclosure.

One aspect of the present invention provides water pH adjusting compositions comprising a solubility enhancing aqueous composition, propylene glycol and, optionally, citric acid.

Another aspect of the present invention provides a domestic animal water modifying composition comprising a solubility enhancing aqueous composition, water, propylene glycol and, optionally, citric acid.

Another aspect of the present invention provided a domestic animal feed modifying composition comprising a solubility enhancing aqueous composition, water, propylene glycol and, optionally, citric acid.

An additional aspect of the present invention provides a domestic animal water modifying composition with copper comprising a solubility enhancing aqueous composition, water, propylene glycol, copper sulfate and, optionally, citric acid.

Another aspect of the present invention provided a domestic animal feed modifying composition with copper comprising a solubility enhancing aqueous composition, water, propylene glycol, copper sulfate and, optionally, citric acid.

A further aspect of the present invention provides a domestic animal water modifying composition with silver comprising a solubility enhancing aqueous composition, water, propylene glycol, silver sulfate and, optionally, citric acid.

Another aspect of the present invention provided a domestic animal feed modifying composition with silver comprising a solubility enhancing aqueous composition, water, propylene glycol, silver sulfate and, optionally, citric acid.

One element of each of the compositions of the present invention comprises a solubility enhancing aqueous composition. It is the intent of the present disclosure to permit the skilled artisan to prepare a solubility enhancing aqueous composition element using a range of water in a ratio to the concentrations of ammonium sulfate and sulfuric acid for each preparation, with the resultant sulfate and bisulfate anions and ammonium cations, and the amount of water to be determined by such artisan, each within the parameters taught herein.

For the sake of clarity, three solutions are formed in preparing the second solution which comprise solubility enhancing aqueous compositions: 1) ammonium sulfate stock solution; 2) a first solution comprising the ammonium sulfate stock solution in sulfuric acid; and 3) second solution comprising solubility enhancing aqueous compositions. Unless context otherwise dictates, general references to the use of a first solution and a second solution refers to the preparation of the referenced solubility enhancing aqueous compositions used in the preparation compositions of the present invention.

To prepare the first solution of a composition of the present disclosure, one needs to first prepare an ammonium sulfate stock solution. For example and without limitation, an ammonium sulfate stock solution is prepared to contain 20%, 24%, 30%, 40%, 50% or 60% of ammonium sulfate in water, typically, without restriction, deionized water. For the sake of clarity, the percent concentration of ammonium sulfate can be any whole number or fraction thereof in a range from about 20% to about 60%. The molar concentration of the stock solution varies by the ammonium sulfate concentration in a known volume of water.

By means of exemplification, the following calculations are used to determine the amount of ammonium sulfate and sulfuric acid to add to form a first solution.

Ammonium Sulfate:

Ammonium sulfate equals 132.14 grams per mole. Using, for example, a 24% ammonium sulfate solution, such solution would have 240 grams of ammonium sulfate per 1 L of water. Because the ratio of ammonium sulfate to sulfuric acid in this exemplification is about 48% ammonium sulfate to about 52% sulfuric acid, the first solution would contain 115.20 grams of ammonium sulfate, equaling 0.872 moles per liter. As such, one mole of ammonium sulfate provides 2 moles of ammonium and 1 mole of sulfate. Accordingly, 0.872 moles of ammonium sulfate provides to the ammonium sulfate stock solution 1.744 moles of ammonium and 0.872 moles of sulfate required per liter of reaction in forming the first solution.

Sulfuric Acid (Concentrated):

Sulfuric acid equals 98.079 g/mole as concentrated (95% to 98%) reagent grade sulfuric acid. Sulfuric acid exists as a liquid and has a density of 1.840 g/mL. For this example, sulfuric acid comprises 52% of a first solution of 1 liter. As such, 520 mL (0.52 L) of sulfuric acid is added to the ammonium sulfate stock solution. 520 mL times 1.840 g/mL equals 956.8 grams. 956.8 grams divided by 98.079 grams per mole provides the target concentration of 9.755 moles of sulfuric acid per liter of preparation. 9.755 moles of sulfuric acid provides 9.755 moles of sulfate anion and 2 moles of hydrogen resulting from each mole of acid, in this example, 19.51 moles of hydrogen per liter of said first solution.

Reaction Unit:

Using the values set forth above, in this instance, there are about 0.872 moles of ammonium sulfate to about 9.755 moles of sulfuric acid providing:

about 0.872 moles of ammonium sulfate provides about 0.872 moles of sulfate and about 1.744 moles of ammonium required per reaction unit liter; and about 9.755 moles per liter of sulfuric acid provides about 9.755 moles of sulfate anion and about 19.51 moles of hydrogen per liter of reaction unit.

Using this example, each reaction unit, forming a first solution, would contain:

about 0.972 moles of sulfate (from ammonium sulfate) plus about 9.755 moles of sulfate from ammonium sulfate equaling about 10.627 moles of sulfate anion per liter comprising sulfate anions alone, bisulfate anions alone or, typically, a mixture of sulfate and bisulfate anions;

about 1.744 moles of ammonium per liter; and about 19.51 moles of hydrogen per liter.

To accomplish the formation of a solubility enhancing aqueous composition, a second solution is formed by the addition of water, a critical component, in an appropriate amount, to provide solubility enhancing aqueous compositions that are substantially free, or free, of solids. Alternatively, a first solution can be added to the appropriate amount of water to form a second solution. As such, the order of addition of a first solution to water or water to the first solution to form a second solution is not of consequence. Use of the solubility enhancing aqueous compositions may form solids when combined with other chemicals or other materials when using such solubility enhancing aqueous compositions for its intended purpose: enhancing solubility of such chemical compounds or other materials.

Generally, water is at least fifty percent of the second solution that represents the solubility enhancing aqueous compositions. Moreover, water can comprise from at least fifty percent up to ninety-nine percent of the second solution or final composition. However, the lower concentrations of water, as taught herein, are typically more useful for further use of the present compositions used for solubility enhancement. Accordingly, the amount of water used to form a second solution is at least 50% of the volume of the first solution or at least 50% of the mass of the first solution. Alternatively, the mass of the sum of the ammonium ion concentration plus sulfate ion concentration in a first solution can also serve as the basis of the amount of water to be added to form a second solution wherein the amount of water added, by mass, to form a second solution equals at least 50% of the sum of the mass of ammonium ions plus sulfate ions. Another means by which to represent the amount of water added to the first solution is that the amount of water used to form a second solution is at least equal to the volume of the first solution or at least equal to the mass of the first solution. Alternatively, the mass of the sum of the ammonium ions plus sulfate ions in a first solution can also serve as the basis of the amount of water to be added to form a second solution wherein the amount of total water, including the water used to solubilize the ammonium sulfate and added water, is at least equal to the sum of the mass of ammonium ions plus sulfate ions.

The amount of water used to prepare the second solution, representing solubility enhancing aqueous compositions, can be calculated in volume/volume (total volume of the first solution plus at least the same volume of water). Alternatively, the ratio of reactants to water (mass/mass) may be used. Using the values for ammonium sulfate and sulfuric acid from the above example, 115.20 grams of ammonium sulfate and 956.8 grams of sulfuric acid were used providing a sum of 1072 grams of reactants. Accordingly, for water to equal at least fifty percent of the final composition, at least 1072 grams of water are added to the first solution to form the second solution, a solubility enhancing aqueous composition. Alternatively, as referenced above, the amount of water used to form a second solution can be based on the total mass or volume of the first solution. Accordingly, any method taught herein can be used for calculating the amount of water required to form a second solution. As taught above, using the mass of the reactants to dictate the amount of water required to form a second solution is the minimum amount of water required to provide an aqueous solution and to impart the qualities of the compositions of the present invention as further delineated herein.

To achieve solubility enhancement, ranges of concentration of sulfate ions and ammonium ions in the solubility enhancing aqueous compositions are used while maintaining such compositions that are essentially free or are free of salt crystals or other solids from the reactants that form a first solution. Accordingly, a first solution comprises an anionic component consisting essentially of sulfate ions, alone or in combination with bisulfate ions, has a concentration range from about 8.00 moles per liter to about 13.00 moles per liter of the first solution volume. The first solution also comprises a cationic component consisting essentially of ammonium ions has a concentration from about 1.45 moles per liter to about 2.01 moles per liter of the first solution volume. Typically, when the lower values within the range for sulfate ions are selected for preparing a first solution, a lower value within the stated range for ammonium ions is selected and included in the preparation of the first solution. Similarly, when higher values within the stated range for sulfate ions are selected for the preparation of a first solution, higher values of ammonium ions are selected for the preparation of a first solution. Although not imperative, typically, the sulfate ion concentration within the given range of from about 8.00 moles per liter to about 13.00 moles per liter of first solution volume is proportionally commensurate with the range of ammonium ion concentration within the given the given range of from about 1.45 moles per liter to about 2.01 moles per liter of first solution volume.

In another embodiment of the solubility enhancing aqueous compositions, a first solution comprises an anionic component comprising sulfate ions, alone or in combination with bisulfate ions, has a concentration range from about 8.00 moles per liter to about 13.00 moles per liter of the first solution volume. The first solution also comprises a cationic component comprising ammonium ions has a concentration from about 1.45 moles per liter to about 2.01 moles per liter of the first solution volume. Typically, when the lower values within the range for sulfate ions are selected for preparing a first solution, a lower value within the stated range for ammonium ions is selected and included in the preparation of the first solution. Similarly, when higher values within the stated range for sulfate ions are selected for the preparation of a first solution, higher values of ammonium ions are selected for the preparation of a first solution. Although not imperative, typically, the sulfate ion concentration within the given range of from about 8.00 moles per liter to about 13.00 moles per liter of first solution volume is proportionally commensurate with the range of ammonium ion concentration within the given the given range of from about 1.45 moles per liter to about 2.01 moles per liter of first solution volume. When prepared according to the solubility enhancing aqueous composition embodiments provided herein, the resulting hydrogen ion concentration will typically fall within the range from about 17.38 moles per liter to about 21.68 moles per liter of first solution volume but falling within this hydrogen range is not necessarily critical to the final first solution but is beneficial when using the solubility enhancing aqueous compositions for enhancing solubility of compounds or other materials depending upon the nature thereof.

The processes for preparing the solubility enhancing aqueous compositions can be carried out using traditional laboratory and safety equipment when using concentrated acid and water that could generate significant heat. Within these considerations, the selection of laboratory equipment is not critical to the formation of the present solutions or compositions. More particularly, the preparation of the first solution wherein the reactants ammonium sulfate stock solution is combined with sulfuric acid requires laboratory apparatuses that are approved for heat generation, splashing and, potentially, pressure relief. Accordingly, the first solution should be prepared in a laboratory vessel that is not sealed providing for pressure relief, rather than a potential hazardous situation with pressure build up in an unrated vessel. The ordinarily skilled artisan should be knowledgeable in the selection and use of such apparatuses.

For commercial-scale production of solubility enhancing aqueous compositions, the ordinarily skilled artisan will recognize that the reaction between the solubilized ammonium sulfate and sulfuric acid is typically exothermic. As such, a reaction vessel appropriate to safely contain and, typically, cool this reaction, is recommended. Commercial production of a first solution and a second solution can be accomplished using any of the teachings herein but on a larger scale than the laboratory scale teachings and examples disclosed herein. Moreover, such commercial production can be accomplished, without limitation, as taught herein or with equipment known to the ordinarily skilled artisan.

The order of adding the reactants to each other is not critical in the preparation of a first solution. Either the stock ammonium sulfate solution can be added to the sulfuric acid or sulfuric acid is added to the stock ammonium sulfate stock solution to avoid the splattering typical of adding a solution containing water to acid. Typically, the heat generating reaction forming the first solution is permitted to run to conclusion, with the term "conclusion" having the meaning understood by the ordinarily skilled artisan, prior to adding the first solution to the required water or water to the first solution, without preference to the order of addition. For the sake of clarity, conclusion of the reaction between the ammonium sulfate stock solution and sulfuric acid typically occurs when the reactants no longer produce an exothermic reaction and the temperature of the solution begins to decrease to ambient temperature.

Alternatively, the formation of a first solution is not required and the ammonium sulfate stock solution and sulfuric acid can be combined with the final desired volume of a composition of the present invention. Accordingly, another aspect of the present invention provides a solubility enhancing aqueous composition comprising an anionic component consisting essentially of sulfate anions having a concentration from about 8.00 moles per liter to about 13.00 moles per liter comprising about one-quarter of the final composition volume or less, a cationic component consisting essentially of ammonium ions having a concentration from about 1.45 moles per liter to about 2.01 moles per liter of about one-quarter of the final composition volume or less, and water comprising at least one-half of the final composition volume.

An alternate solubility enhancing aqueous composition comprises an anionic component comprising sulfate anions having a concentration from about 8.00 moles per liter to about 13.00 moles per liter about one-half of the final solubility enhancing aqueous compositions volume and a cationic component comprising ammonium ions having a concentration from about 1.45 moles per liter to about 2.01 moles per liter of about one half of the final solubility enhancing aqueous composition volume.

Another alternate solubility enhancing aqueous composition comprises an anionic component consisting essentially of sulfate anions having a concentration from about 8.00 moles per liter to about 13.00 moles per liter and a cationic component consisting essentially of ammonium ions having a concentration from about 1.45 moles per liter to about 2.01 moles per liter of the final solubility enhancing aqueous composition volume wherein said liter volume for calculation for the volume of water comprising the ammonium ions and sulfate anions comprises at least one percent of the total volume of the solubility enhancing aqueous composition.

A further alternate solubility enhancing aqueous composition comprises an anionic component consisting essentially of sulfate anions having a concentration from about 8.00 moles per liter to about 13.00 moles per liter of not more than about one-half of the final solubility enhancing aqueous composition volume and a cationic component consisting essentially of ammonium ions having a concentration from about 1.45 moles per liter to about 2.01 moles per liter of not more than about one-half the final solubility enhancing aqueous composition volume.

An additional alternate solubility enhancing aqueous composition comprises an anionic component comprising sulfate anions having a concentration from about 8.00 moles per liter to about 13.00 moles per liter of not more than about one-half of the final solubility enhancing aqueous composition volume and a cationic component comprising ammonium ions having a concentration from about 1.45 moles per liter to about 2.01 moles per liter of not more than about one-half the final solubility enhancing aqueous composition volume.

Although certain aspects of the solubility enhancing aqueous compositions allow for highly dilute concentrations for the ammonium cations and sulfate anions, specific concentrations of these ions can be calculated on a basis as if such combination were prepared on a per liter basis wherein the volume of such preparation comprised 1%, 10%, 20%, 30%, 40%, 48%, 50% or 60% of the total volume of the final solubility enhancing aqueous composition. For the sake of clarity, the volume of water can be any whole number or fraction thereof in a range from about 1% to about 60%. In addition, the volume of total water in each of the solubility enhancing aqueous compositions taught herein can be calculated by a variety of methods as taught herein and are not limited by any one teaching. As such, the amount of water used to form a second solution can be based on weight/weight (first solution weight to the weight of water added to form a second solution); mass/mass (first solution mass to the mass of water added to form a second solution; and mass/mass (the mass of the sum of ammonium ions and sulfate ions to the mass of total water in the second solution). Each of these methods can be used in a two-step process wherein a first solution is formed and water is added to form a second solution, or a one-step process where the elements of a second solution of the present invention are pre-calculated and added accordingly.

As mentioned above, one aspect of the present invention provides water pH adjusting compositions, particularly for use with domestic animals, comprising a solubility enhancing aqueous composition, propylene glycol and, optionally, citric acid.

For the preparation of water pH adjusting compositions, domestic animal water modifying compositions and domestic animal feed modifying compositions of the present invention without the addition of, for example, copper sulfate, silver sulfate or one or more other additives, a solubility enhancing aqueous composition, propylene glycol, and, optionally, citric acid and water, typically purified water, are mixed using traditional mixing/blending techniques. The solubility enhancing aqueous compositions are prepared as taught herein. The concentration of solubility enhancing aqueous composition used in preparing the present compositions, each prepared only using a solubility enhancing aqueous composition, propylene glycol and optional citric acid, and water is used at a range from about 60% to about 80% w/w. More specifically, this solubility enhancing aqueous composition concentration in such compositions is any whole or fractional number within the stated range greater than about 60% including, for example and without limitations, a percentage selected from the group consisting of about 60%, 61%, 62%, 63%, 64%, 65%, 66%, 67%, 68%, 69%, 70%, 71%, 72%, 73%, 74%, 75%, 76%, 77%, 78%, 79% and 80%. When the amount of water used in the second solution in preparing the solubility enhancing aqueous composition is greater than 50%, the amount of solubility enhancing aqueous composition used in the preparation of water pH adjusting compositions is proportionally increased providing the amount of solubility enhancing aqueous solution is not less than about 60% w/w of each respective composition.

The propylene glycol element of each of the present compositions is used at concentration ranges from about 13% to about 29% w/w and, more specifically, such concentration is any whole or fractional number within the stated range greater than about 13% w/w including, without limitation, a percentage selected from the group consisting of about 13%, 14%, 15%, 16%, 17%, 18%, 19%, 20%, 21%, 22%, 23%, 24%, 25%, 26%, 27%, 28% and 29% w/w. Although various concentrations of propylene glycol can be used in each composition of the present invention, a high concentration of about 99.9% is most useful and is the concentration of propylene glycol used in the exemplified compositions taught herein.

Citric acid is an optional element of the present water pH adjusting compositions, domestic animal water modifying compositions and domestic animal feed modifying compositions of the present invention without the addition of, for example, copper sulfate, silver sulfate or one or more other additives is used at a concentration from about 3% to about 10% w/w of the total of each such composition and, more specifically, such concentration is any whole or fractional number within the stated range greater than about 3% w/w including, without limitation, about 3%, 4%, 5%, 6%, 7%, 8% 9% and 10% w/w. Citric acid has negligible effect on the beneficial activities of the respective compositions but is advantageous when used as a water flavoring agent, making the water and/or feed more palatable to the end-user animal.

Similarly, water, typically, purified water, is optionally added to the present compositions and is used at a concentration from about 0% to about 6% w/w of the total of such compositions and, more specifically, such concentration is any whole or fractional number within the stated range greater than about 0% w/w including, without limitation, 0%, 1%, 2%, 3%, 4%, 5% and 6% w/w. The sum of percentages used for each element of the present compositions need to equal 100% w/w of the total of each respective composition.

For the sake of clarity, the above preparations are, for each of the water pH adjusting compositions, domestic animal water modifying compositions and domestic animal feed modifying compositions of the present invention without the addition of, for example, copper sulfate, silver sulfate or one or more other additives, the same with each composition being differentiated by the specific uses further described herein.

An additional aspect of the present invention provides a domestic animal water or feed modifying composition with copper comprising a solubility enhancing aqueous composition, water, propylene glycol, copper sulfate and, optionally, citric acid.

For the preparation of domestic animal water or feed modifying compositions with copper of the present invention, a solubility enhancing aqueous composition, propylene glycol, copper sulfate, water and, optionally, citric acid are mixed/blended using traditional mixing/blending techniques. In the present compositions, water (typically purified, distilled or deionized water), is used at a concentration from about 32% to about 48% w/w of the total domestic animal water modifying composition with copper. More specifically, water is used at a concentration in domestic animal water modifying compositions with copper at a concentration is any whole or fractional number within the stated range greater than about 32% w/w including, for example and without limitations, a percentage selected from the group consisting of about 32%, 33%, 34%, 35%, 36%, 37%, 38%, 39%, 40%, 41%, 42%, 43%, 44%, 45%, 46%, 47% and 48% w/w of the domestic animal water or feed modifying composition with copper. As referenced above, the amount of water in the second solution forming the solubility enhancing aqueous composition, water comprises at least 50% of the second solution and, more typically comprises, without limitation, about 50%, 60%, 70% or 80% water in the second solution.

For exemplification purposes, with water comprising 50% w/w of the second solution when preparing the solubility enhancing aqueous composition, the solubility enhancing aqueous composition is used in preparing the domestic animal water modifying composition with copper at concentrations ranging from about 4% to about 12% w/w of the total composition of a domestic animal water modifying compositions with copper of the present invention. More specifically, this solubility enhancing aqueous composition concentration in a domestic animal water modifying composition with copper is any whole or fractional number within the stated range greater than about 4% w/w including, for example and without limitations, a percentage selected from the group consisting of about 4%, 5%, 6%, 7%, 8%, 9%, 10%, 11% and 12% w/w of the total domestic animal water or feed modifying compositions with copper. When the amount of water used in the second solution in preparing the solubility enhancing aqueous composition is greater than 50%, the amount of solubility enhancing aqueous composition used in the preparation of a domestic animal water or feed modifying composition with copper is proportionally increased providing the amount of solubility enhancing aqueous solution is not less than about 4% w/w of the total domestic animal water modifying compositions with copper of the present invention.

The propylene glycol element of the present compositions is used at concentrations in domestic animal water and feed modifying compositions with copper of the present invention in a range from about 25% to about 40% and, more specifically, is any whole or fractional number within the stated range greater than about 25% w/w including, for example and without limitations, a percentage selected from the group consisting of about 25%, 26%, 27%, 28%, 29%, 30%, 31%, 32%, 33%, 34%, 35%, 36%, 37%, 38%, 39%, and 40% w/w of the total domestic animal water and feed modifying compositions with copper of the present invention.

The copper sulfate element of the present domestic animal water and feed modifying compositions with copper is typically added to the aqueous solution formed by the blending/mixing of the water, solubility enhancing aqueous composition and propylene glycol described above at a concentration from about 14% percent to about 24% w/w of the total aqueous element volume of the composition. More specific concentrations of copper sulfate in the present compositions is any whole or fractional number within the stated range greater than about 14% w/w including, for example and without limitations, a percentage selected from the group consisting of about 14%, 15%, 16%, 17%, 18%, 19%, 20%, 21%, 22%, 23% and 24% w/w of the total domestic animal water and feed modifying compositions with copper of the present invention. Copper sulfate is readily available through various commercial suppliers.

Citric acid is an optional element of the present domestic animal water and feed modifying compositions with copper and is used at a concentration from about 5% to about 15% w/w of the total domestic animal water and feed modifying compositions with copper. More specifically, citric acid is used at concentration within the stated range greater than about 5% w/w including, without limitation, a percentage selected from the group consisting of about 5%, 6%, 7%, 8%, 9%, 10%, 11%, 12%, 13%, 14% and 15% w/w of the total domestic animal water and feed modifying compositions with copper. Citric acid in used in the present compositions as a water flavoring agent, making the water more palatable to the end-user animal. The sum of percentages used for each element of the present domestic animal water and feed modifying composition with copper need to equal 100% w/w of the total domestic animal water and feed modifying compositions with copper.

Accordingly, when citric acid is included in the present compositions, the concentration range of water is from about 32% to about 48% w/w, the solubility enhancing aqueous composition (with water comprising 50% w/w of the second solution when preparing the solubility enhancing aqueous composition) is from about 4% to about 12% w/w, propylene glycol concentration range is from about 25% to about 40% w/w, copper sulfate concentration range is from about 14% to about 24% w/w and, when added, citric acid concentration is from about 5% to about 15% w/w of the total domestic animal water and feed modifying compositions with copper wherein the sum of all elements equals 100% w/w of the total domestic animal water and feed modifying composition with copper.

An additional exemplification of the present domestic animal water and feed modifying composition with copper is as follows: water concentration is 37.15% w/w, solubility enhancing aqueous composition concentration is 7.94% w/w, propylene glycol concentration is 30.1% w/w, copper sulfate is 17.34% w/w and citric acid composition is 7.44% w/w of the total domestic animal water and feed modifying composition with copper.

In the preparation of the present domestic animal water and feed modifying composition with copper, there is not a required sequence of blending and/or mixing of the various elements comprising this composition. However, to ensure the copper sulfate is appropriately solubilized, it is useful to add the copper sulfate to the greatest volume of aqueous solution which typically occurs following the blending/mixing of water, the solubility enhancing aqueous solution and propylene glycol and, when used, the optional citric acid.

An additional aspect of the present invention provides a domestic animal water and feed modifying composition with silver comprising a solubility enhancing aqueous composition, water, propylene glycol, silver and, optionally, citric acid.

For the preparation of domestic animal water and feed modifying compositions with silver of the present invention, a solubility enhancing aqueous composition, propylene glycol, silver sulfate, water and, optionally, citric acid are mixed/blended using traditional mixing/blending techniques. In the present compositions, water (typically purified, distilled or deionized water is used), is used at a concentration from about 41% to about 60% w/w of the total domestic animal water and feed modifying composition with silver. More specifically, water is used at a concentration in domestic animal water and feed modifying compositions with silver is any whole or fractional number within the stated range greater than about 41% w/w including, for example and without limitations, a percentage selected from the group consisting of about 41%, 42%, 43%, 44%, 45%, 46%, 47%, 48%, 49%, 50%, 51%, 52%, 53%, 54%, 55%, 56%, 57%, 58%, 59% and 60% w/w. As referenced above, the amount of water in the second solution forming the solubility enhancing aqueous composition, water comprises at least 50% volume/volume of the second solution and, more typically comprises, without limitation, about 50%, 60%, 70% or 80% water in the second solution.

For exemplification purposes, with water comprising 50% volume/volume of the second solution when preparing the solubility enhancing aqueous composition, the solubility enhancing aqueous composition is used in preparing the domestic animal water and feed modifying compositions with silver at concentrations ranging from about 4% to about 12% w/w of the total composition of a domestic animal water modifying compositions with silver of the present invention. More specifically, this solubility enhancing aqueous composition concentration in a domestic animal water and feed modifying composition with silver is any whole or fractional number within the stated range greater than about 4% w/w including, for example and without limitations, a percentage selected from the group consisting of about 4%, 5%, 6%, 7%, 8%, 9%, 10%, 11% and 12% w/w of the total domestic animal water and feed modifying compositions with silver. When the amount of water used in the second solution in preparing the solubility enhancing aqueous composition is greater than 50%, the amount of solubility enhancing aqueous composition used in the preparation of a domestic animal water and feed modifying composition with silver is proportionally increased providing the amount of solubility enhancing aqueous solution is not less than 4% w/w of the total domestic animal water modifying compositions with silver of the present invention.

The propylene glycol element of the present compositions is used at concentrations from about 32% to about 47% and, more specifically, such concentration is any whole or fractional number within the stated range greater than about 32% w/w including, for example and without limitations, a percentage selected from the group consisting of about 32%, 33%, 34%, 35%, 36%, 37%, 38%, 39%, 40%, 41%, 42%, 43%, 44%, 45%, 46%, and 47% w/w of the total domestic animal water and feed modifying compositions with silver of the present invention.

The silver sulfate element of the present domestic animal water and feed modifying compositions with silver is added to the aqueous solution formed buy the mixing/blending of the water, solubility enhancing aqueous composition and propylene glycol described above at a concentration from about 0.33% to about 0.48% w/w of the total aqueous element volume of the composition. More specific concentrations of silver sulfate in the present compositions is any whole or fractional number within the stated range greater than about 0.33% w/w including, for example and without limitations, a percentage selected from the group consisting of about 0.33%, 0.34%, 0.35%, 0.36%, 0.37%, 0.38%, 0.39%, 0.40%, 0.41%, 0.42%, 0.43%, 0.44%, 0.45%, 0.46%, 0.47% and 0.48% w/w of the total domestic animal water modifying compositions with silver of the present invention.

Citric acid is an optional element of the present domestic animal water and feed modifying compositions with silver and is used at a concentration from about 5% to about 15% w/w of the total domestic animal water and feed modifying compositions with silver. More specifically, concentrations of citric acid is any whole or fractional number within the stated range greater than about 5% w/w including, for example and without limitations, a percentage selected from the group consisting of about 5%, 6%, 7%, 8%, 9%, 10%, 11%, 12%, 13%, 14% and 15% w/w of the total domestic animal water and feed modifying compositions with silver. Citric acid in used in the present compositions as a water flavoring agent, making the water more palatable to the end-user animal. The sum of percentages used for each element of the present domestic animal water and feed modifying compositions with silver need to equal 100% w/w of the total domestic animal water and feed modifying compositions with silver.

Accordingly, when citric acid is included in the present compositions, the concentration range of water is from about 41% to about 60% w/w, the solubility enhancing aqueous composition is from about 4% to about 12% w/w, propylene glycol concentration range is from about 32% to about 47% w/w, silver sulfate concentration range is from about 0.33% to about 0.48% w/w and, when added, citric acid concentration is from about 5% to about 15% w/w of the total domestic animal water and feed modifying composition with silver wherein the sum of all elements equals 100% w/w of the total domestic animal water and feed modifying composition with silver.

An additional exemplification of the present domestic animal water and feed modifying composition with silver is as follows: water concentration is 46.8% w/w, solubility enhancing aqueous composition concentration is 7.94% w/w, propylene glycol concentration is 37.55% w/w, silver sulfate is 0.38% w/w and citric acid composition is 7.34% w/w of the total domestic animal water and feed modifying composition with silver.

In the preparation of the present domestic animal water and feed modifying composition with silver, there is not a required sequence of blending and/or mixing of the various elements comprising this composition. However, to ensure the silver sulfate is appropriately solubilized, it is useful to add the silver sulfate to the greatest volume of aqueous solution which typically occurs following the blending/mixing of water, the solubility enhancing aqueous solution and propylene glycol and, when used, the optional citric acid.

Drinking water supplied to domestic animals is frequently alkaline but needs to be adjusted to a pH from about 5.0 to about 7.0 prior to supplementing the water supply with any of the domestic animal water modifying compositions taught herein. Target drinking water pH is any whole or fractional number within the stated range greater than about pH 5.0 including, for example and without limitations, a pH selected from the group consisting of about 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9 and 7.0. For certain uses, an optimal pH is about 5.5.

If not already present, an access/injection port/metered system may need to be installed between the water supply and one or more medicators, when used, that are the site of injection of the domestic animal water modifying compositions. For exemplification purposes, the site of pH adjustment is shown in the following schematic:

Water supply→injection port/metered system for pH adjustment→medicator

Although water pH may be adjusted by using one or more of a plethora of means known to the ordinarily skilled artisan, use of the water pH adjusting compositions of the present invention may potentiate the positive benefits of the domestic animal water and feed modifying compositions of the present invention, such benefits set forth in additional detail herein below. As taught herein, the pH of the water pH adjusting compositions is about 1.4 but may vary depending upon the concentration percentages of the various elements comprising such a composition. Accordingly, the pH of the water pH adjusting composition, the pH of the water supply, and the target pH of the water flowing to the medicator must first be determined. Tables and calculators are available to determine the volume of a water pH adjusting composition, particularly for use with domestic animals, required to adjust the water to the target pH. Such tables and calculators and the process for adjusting flowing water pH is well known to the skilled artisan. Accordingly, an additional aspect of the present invention provides a method for adjusting the pH of domestic animal water comprising adding a pH adjusting amount of a water pH adjusting composition of the present invention to domestic animal water. The target range for such domestic animal pH water adjustment is as set forth herein above.

Following or independent of domestic animal water pH adjustment, a non-toxic amount of at least one composition selected from the group consisting of a domestic animal water modifying composition, a domestic animal water modifying composition with copper and a domestic animal water modifying composition with silver is administered to the optionally pH adjusted water supply for the target animal or animals. Such compositions can be used with all domestic animals with a focus on livestock, typically poultry and, more typically, chickens. Water supplied to domestic animals can be adjusted as taught herein above or, alternatively, the domestic animal water modifying compositions of the present invention can also be used to adjust such water to a target range from about 5.0 to about 7.0 with an optimal pH being about 5.5.

Administration of each such compositions can be through a medicator or any other metering or measuring device wherein an accurate dosage can be added to the water supply, typically a water supply following optional pH adjustment to a pH range from about 5.0 to about 7.0 with a target of about pH 5.5. The individual grower can elect the dosing of such compositions and adjust according to the health of the animals to which such compositions are administered although it is recommended that such compositions be administered to the target domestic animal at a dosage of from about 6 ounces to about 10 ounces of the respective composition(s) to about five gallons of water. This five gallon solution is then added to a domestic animal water supply at a rate from about one-half ounce to about three ounces per one gallon of water provided to the target animal.

More specifically, dosages for administration of such compositions is any whole or fractional number within the stated range greater than about 6 ounces to five gallons of water including, for example and without limitations, an amount selected from the group consisting of about 6 ounces, about 7 ounces, about 8 ounces, about 9 ounces and about 10 ounces per about five gallons of water provided to the animals. The use of a medicator will add to the accuracy of providing such dose to the target domestic animal. Accordingly, the dosage of the five gallon solution added to the target domestic animal water supply can be selected from any whole or fractional number within the stated range from about 0.5 ounces, 1.0 ounce, 1.5 ounces, 2.0 ounces, 2.5 ounces and 3.0 ounces per gallon of water provided to the target animal. For large animals, the amount of such solution can be increased up to about 10.0 ounces per gallon of water provided to the target animals. As previously mentioned, these dosage amount are recommended dosages and an individual grower may use more or less of the present compositions in the five gallons of solution and/or more or less of the five gallon solution per gallon of water provided to the target domestic animal providing the amount remains non-toxic to the respective target domestic animal. Addition of such compositions to domestic animal water should be maintained at a pH range from about 5.5 to about 5.9 through the addition of a pH adjusting composition as taught herein or one of the animal water modifying compositions pf the present invention. Moreover, other materials beneficial to the target domestic animal may be added to the five gallon solution such as, for example and without limitation, minerals, nutritional complexes such as fatty acids/vitamins, copper and the like.

Water treated with the present compositions can be administered to target animals via continuous flow or on-demand water systems. Continuous flow systems can be wasteful whereas on-demand systems can have a more consistent concentration of the present compositions in the water line at all desired times. When more than one of such compositions is administered simultaneously, the dosage of each selected composition should be adjusted such that the total amount of compositions being administered falls within the afore-mentioned dosage range. For example, if each of a domestic animal water modifying composition, domestic animal water modifying composition with copper and/or a domestic animal water modifying composition with silver is administered, the dosage of each composition should be such that the total amount of such administered compositions is in the range from about six ounces to about ten ounces per about the above-referenced five gallons of water solution which is then dosed to the target domestic animal at the dosage rates per gallon of drinking water as taught herein above. Generally, the dosage amount of the present compositions is non-toxic to the target domestic animal.

Although the domestic animal water modifying compositions, domestic animal water modifying compositions with copper and domestic animal water modifying compositions with silver can be administered to the target animals on a daily basis, administration of such compositions with copper and silver may be more effective in providing the benefits listed below to the target domestic animal when administered three times per week. It may be of further benefit to administer one composition, with either copper of silver, three times per week, substituted by another of the compositions of the present invention with copper or silver the following week. Such compositions may be administered to domestic animals throughout their respective targeted lifecycle or grow-out period. Domestic animal water modifying compositions without copper or silver can be used 24 hours per day, seven days per week, throughout the growth cycle of the targeted animal, at the election of the respective grower. Typically, however, such compositions without copper of silver are provided to the target animals about three to about four times per week. Notwithstanding any of the dosages suggested in this paragraph, any of such compositions can be administered at will and at the dosage and timing discretion of the grower.

The grower may add optional ingredients before or after the injection/addition of a domestic animal water modifying composition to the domestic animal water supply or may add such ingredients to a domestic animal water modifying composition of the present invention. Such additives and the respective uses are well known to the skilled grower and include, without limitation, vitamins, minerals, medicaments and the like.

Domestic animal water modifying compositions may also be added to domestic animal feed and are described and defined herein as domestic animal feed modifying compositions. Such domestic animal feed modifying compositions can be added to, applied to and/or blended with domestic animal feed or other substances fed to domestic animals to aid in increasing, sustaining and/or improving domestic animal growth and/or health. Typically, such domestic animal feed modifying compositions are added to the desired substance and/or substrate at a dosage of about 30 to about 80 ounces per ton of substrate and is applied to the substrate, typically feed with or without additives, using methods well known in the art of animal husbandry. More particularly, such compositions can be added to the desired substance and/or substrate at any whole or fractional number greater than about 30 ounces per ton up to about 80 ounces per ton.

Various benefits to domestic animals are attributed to the administration of domestic animal water modifying compositions, domestic animal water modifying compositions with copper, domestic animal water modifying compositions with silver and domestic animal feed modifying compositions compared to domestic animals not receiving administration of such compositions. Accordingly, another aspect of the present invention provides a method of improving weight gain in domestic animals comprising administering to such domestic animal at least one composition selected from the group consisting of a domestic animal water modifying composition, a domestic animal water modifying composition with copper, a domestic animal water modifying composition with silver and a domestic animal feed modifying composition compared to domestic animals not receiving such administration.

An additional aspect of the present invention provides a method of decreasing domestic animal mortality comprising administering to such domestic animal at least one composition selected from the group consisting of a domestic animal water modifying composition, a domestic animal water modifying composition with copper, a domestic animal water modifying composition with silver and a domestic animal feed modifying composition compared to domestic animals not receiving such administration.

A further aspect of the present invention provides a method of improving feed conversion ratios in domestic animals comprising administering to such domestic animal at least one composition selected from the group consisting of a domestic animal water modifying composition, a domestic animal water modifying composition with copper, a domestic animal water modifying composition with silver and a domestic animal feed modifying composition compared to domestic animals not receiving such administration.

An additional aspect of the present invention provides a method for improving the overall health of a domestic animal comprising administering to such domestic animal at least one composition selected from the group consisting of a domestic animal water modifying composition, a domestic animal water modifying composition with copper, a domestic animal water modifying composition with silver and a domestic animal feed modifying composition compared to domestic animals not receiving such administration. As used in this context, the term "overall health" refers to a combination of various positive factors including, for example and without limitation, growth characteristics, weight gain, intestinal health, robust bearing, increased feed consumption and increased water consumption.

Another aspect of the present invention provides a reduction in the grow-out period for domestic animals comprising administering to such domestic animals at least one composition selected from the group consisting of a domestic animal water modifying composition, a domestic animal water modifying composition with copper, a domestic animal water modifying composition with silver and a domestic animal feed modifying composition compared to domestic animals not receiving such administration. A grow-out period refers to the amount of time a grower would expect to feed a domestic animal, typically livestock, until such animal attains its targeted market weight. For example, the targeted grow-put period for fryer chickens is about forty-eight days, for broiler chickens is about nine weeks and for turkeys is about 18 weeks. A reduction in the grow-out period would be a grow-out period less in time than that expected for the respective domestic animal group.

Each of the methods of using the domestic animal water modifying compositions, domestic animal water modifying compositions with copper, domestic animal water modifying compositions with silver and domestic animal feed modifying compositions recited herein above may be beneficial for domestic animals, generally and including, without limitation, livestock including, without limitation, poultry.

Although specific embodiments have been described above, these embodiments are not intended to limit the scope of the present disclosure, even where only a single embodiment is described with respect to a particular feature. Examples of features provided in this disclosure are intended to be illustrative rather than restrictive unless stated otherwise. The present disclosure is intended to cover such alternatives, modifications and/or equivalents as would be apparent to a person skilled in the art having the benefit of this disclosure.

It is to be understood that the present compositions are limited only to the ranges and or limitation set forth herein and not to variations within such ranges. It is also to be understood that the terminology used herein is for the purpose of describing particular embodiments only, and is not intended to be limiting.

Further modifications and alternative embodiments of various aspects of the embodiments described in this disclosure will be apparent to the skilled artisan in view of the present disclosure. It is to be understood that the forms of the embodiments shown and described herein are to be taken as the presently preferred embodiments. Elements and materials may be substituted for those illustrated and described herein, parts and processes may be reversed and certain features of the embodiments may be utilized independently, all as would be apparent to one skilled in the art after having the benefit of the description. Changes may be made in the elements described herein without departing from the spirit and scope of the appended claims.

EXAMPLES

Example 1

Preparation of an ammonium sulfate stock solution: Into a volumetrically calibrated common 250 mL beaker, 90 mL of deionized $H_2O$ was added. 20 grams of $(NH_4)_2SO_4$ was completely dissolved into the deionized water. The total volume was brought to 100 mL using additional deionized water. 20 grams $(NH_4)_2SO_4$ per 100 mL $H_2O$ is a 20% solution and is a 1.51 M solution.

Example 2

Direct preparation of a second solution without the prior preparation of a first solution wherein the ratio of a first solution equivalent to water addition in this step is four parts water to one part first solution equivalent:
  1.15 mL of 20% $(NH_4)_2SO_4$ was added to a common 10 mL polypropylene centrifuge tube
  8.0 mL deionized water added to tube
  0.850 mL of concentrated (95-98%) sulfuric acid ($H_2SO_4$) added to tube with sufficient force to mix Example 3

Direct preparation of a second solution without the prior preparation of a first solution wherein the ratio of a first solution equivalent to water addition in this step is nine parts water to one part first solution equivalent:
  0.576 mL of 20% $(NH_4)_2SO_4$ was added to a common 10 mL polypropylene centrifuge tube
  9.0 mL deionized water added to tube
  0.424 mL of concentrated (95-98%) sulfuric acid ($H_2SO_4$) added to tube with sufficient force to mix Example 4

Direct preparation of a second solution without the prior preparation of a first solution wherein the ratio of a first solution equivalent to water addition in this step is nineteen parts water to one part first solution equivalent:
  0.288 mL of 20% $(NH_4)_2SO_4$ was added to a common 10 mL polypropylene centrifuge tube
  9.5 mL deionized water added to tube
  0.212 mL of concentrated (95-98%) sulfuric acid ($H_2SO_4$) added to tube with sufficient force to mix Example 5

Preparation of samples for liquid chromatography-mass spectrometry (LC-MS) analysis: Each of Examples 2, 3 and 4, following addition of the sulfuric acid:
  the centrifugation tubes were briefly capped and vortexed to mix thoroughly
  caps were loosened to vent. It was observed that the temperatures of the centrifugation tubes were greater than ambient temperature. Such temperature was not sufficient to melt the centrifugation tubes.
  reactions were allowed to run for about 60 minutes
  after completion of the reaction time, 1 mL samples of the reacted solutions were filtered through a 0.44 micro Pall syringe filter and placed into labeled mass spectrometry vials
  vials were loaded into a Thermo Q Exactive Plus MS system with a Vanquish LC front end
  LC Settings:
  0.25 ml/min
  40% methanol/60% water/0.1% formic acid
  column temp 30° C.
  Thermo Accucore AQ C18 polar end cap column (150 mm×3 mm)
  Injection volumes of 20 uL
  Low Resolution Parameters
  Full MS-SIM
  0-10 minutes
  Positive polarity
  Resolution: 70,000
  AGC Target: $3\times10^6$
  Max IT: 200 ms
  Scan Range: 50-700 mz
  High Resolution Parameters
  Full MS/dd-$MS^2$
  0-7 minutes
  Positive polarity
  Full MS: Resolution: 70,500
    AGC Target: $3\times10^6$
    Max IT: 100 ms
    Scan range: 50-700 mz
  dd-$MS^2$: Resolution: 17,500
    AGC target: $2\times10^6$
    Max IT: 50 ms
    Scan range: 50-700 mz
    Minimum AGC Target: $2\times10^3$ Example 6: Laboratory Preparations of First Solutions for Ion Chromatographic Quantification A 24% solution of ammonium sulfate was created by adding 96 grams of ammonium sulfate to 400 grams deionized water. The solution was mixed to completely dissolve the ammonium sulfate.
  Ten (10) identical 20 mL reactions were produced:
  9.6 mL of the preceding 24% ammonium sulfate solution was added to individually labeled common 50 mL conical tubes by way of calibrated macropipette
  10.4 mL of concentrated sulfuric acid (95-98% reagent grade) was added to each tube by way of calibrated micropipette with sufficient force to thoroughly mix
  Tubes were allowed to stand loosely capped for an hour for reaction to run to completion.

Example 7: Ion Chromatography (IC) Method

Samples from Example 6 were transferred to IC vials, diluted appropriately (1:2500) to bring the ionic concentrations into the range of testing equipment used, and ion chromatography was undertaken using the following parameters:

Ion Chromatography:
Dual Thermo Dionex Aquion
Anion Side:
Column: Dionex IonPac AS22 RFIC 4×250 mm
Mobile phase: carbonate/bicarbonate buffet at 4.8/1.2 mM
Flow: 1.2 mL/min isocratic
Suppressor: Dionex ADRS 600 4 mm
Sup. Voltage: 33 mA
Standard: IC STD for sulfate, 50-500 ppm
Anion cell: 35° C.
Anion column: 30° C.
18 minute run time
Cation Side:
Column: Dionex IonPac CS16 RFIC 5×250 mm
Mobile phase: 30 mM MSA solution
Flow: 1 mL/min isocratic
Suppressor: Dionex CDRS 600 4 mm
Sup voltage: 89 mA
Standard: IC STD for ammonium 20-100 ppm
Cation cell: 40° C.
Cation column: 35° C.
18 minute run time
All 25 uL injections Example 8. Ion Chromatography Results Using the sample preparations set forth in Example 6 and the ion chromatography methods set forth in Example 7, the following results (10 samples; 2 replicates) were obtained:

| Sulfate mol/L | Ammonium mol/L |
|---|---|
| 9.1904799 | 1.6264427 |
| 8.00-13.00 | 1.45-2.01 |

Example 9: Commercial Production of a Solubility Enhancing Composition First Solution Into a 500-gallon polyethylene conical-bottom tank was added 160.5 pounds (about 19.2 gallons) of deionized water. Upon addition of the water, a magnetic-driven shearing pump with an impeller was engaged, circulating the water in the tank. To the water was slowly added 50.7 pounds of pre-weighed ammonium sulfate (GAC Chemical Corp., Searsport Maine, U.S.A.) to enable solubilization of the ammonium sulfate preparing a 31.6% ammonium sulfate solution. The recirculating pump was allowed to run for about 20 minutes for this batch size. Complete solubilization of the ammonium sulfate was visually confirmed by decanting about 250 mL of solution into a PET bottle that was allowed to stand undisturbed for about 15 minutes, confirming complete solubilization.

A 50-gallon Dietrich (Corpus Christi, Texas, U.S.A.) closed-loop, stainless steel-jacketed, glass-lined reactor was pre-cooled using a CTS T-230 cooling tower (Cooling Tower Systems, Macon, Georgia U.S.A.) circulating a mixture of municipal water and sufficient sodium hypochlorite to maintain a pH from about 7.5 to about 7.8. To this reactor was added 400.6 pounds (about 26.1 gallons) of 98% sulfuric acid (Brenntag; Henderson, Kentucky U.S.A.) while a shaft-driven paddle mixer was engaged at 1700 rpm. To the sulfuric acid was rapidly added the ammonium sulfate solution and was mixed for about 20 minutes (until the reaction mixture cooled to a temperature of about 130 degrees Fahrenheit) at which time the reaction to form this first solution was complete.

Example 10: Commercial Production of a Solubility Enhancing Composition Second Solution To a one thousand gallon polyethylene conical-bottom tank is added deionized water equal to the volume or mass of the first solution. To this water is added the first solution. The resulting mixture represents a second solution of the present invention.

Example 11: Ion Chromatography Results

Using the sample preparations set forth in Example 9 and the ion chromatography methods set forth in Example 7, the following results (averages of 3 replicates of 3 samples) were obtained:

| Sulfate mol/L | Ammonium mol/L |
|---|---|
| 10.77769681 | 1.677964718 |
| Target Ranges: | |
| 8.00-13.00 | 1.45-2.01 |

We claim:

1. A method for adjusting the pH of domestic animal water comprising adding a non-toxic, pH adjusting amount of an animal water modifying composition to domestic animal water, wherein the animal water modifying composition comprises:
   about 4 percent to about 12 percent w/w solubility enhancing composition;
   about 25 percent to about 40 percent w/w propylene glycol;
   wherein the solubility enhancing composition comprises sulfate ions, alone or in combination with bisulfate ions, having a concentration from about 8.00 moles per liter to about 13.00 moles per liter of the solubility enhancing aqueous composition volume;
   a cationic component comprising ammonium ions having a concentration from about 1.45 moles per liter to about 2.01 moles per liter of the solubility enhancing aqueous composition volume; and
   hydrogen ions in a concentration from about 17.38 mols per liter to about 21.68 moles per liter of the solubility enhancing aqueous composition volume.

2. A method for improving weight gain in domestic animals, comprising administering to such domestic animals a non-toxic amount of at least one composition selected from the group consisting of a domestic animal water modifying composition and a domestic animal feed modifying composition, compared to domestic animals not receiving such administration, wherein the domestic animal water modifying composition comprises:
   about 4 percent to about 12 percent w/w solubility enhancing composition;
   about 25 percent to about 40 percent w/w propylene glycol;
   wherein the solubility enhancing composition comprises sulfate ions, alone or in combination with bisulfate ions, having a concentration from about 8.00 moles per liter to about 13.00 moles per liter of the solubility enhancing aqueous composition volume;

a cationic component comprising ammonium ions having a concentration from about 1.45 moles per liter to about 2.01 moles per liter of the solubility enhancing aqueous composition volume; and hydrogen ions in a concentration from about 17.38 mols per liter to about 21.68 moles per liter of the solubility enhancing aqueous composition volume;

wherein the domestic animal feed modifying composition comprises a domestic animal water modifying composition added to, applied to and/or blended with domestic animal feed or other substances fed to domestic animals;

wherein at least six ounces of a domestic animal water modifying composition is added to about five gallons of water provided to such domestic animal when water is the selected means of administration of such domestic animal water modifying composition; and wherein from about thirty ounces to about eighty ounces of a domestic animal feed modifying composition is added to about one ton of feed provided to such domestic animal when feed is the selected means of administration of such domestic animal feed modifying composition.

3. A method for decreasing domestic animal mortality, comprising administering to such domestic animals a non-toxic amount of at least one composition selected from the group consisting of a domestic animal water modifying composition and a domestic animal feed modifying composition, compared to domestic animals not receiving such administration, wherein the domestic animal water modifying composition comprises:

about 4 percent to about 12 percent w/w solubility enhancing composition;

about 25 percent to about 40 percent w/w propylene glycol;

wherein the solubility enhancing composition comprises sulfate ions, alone or in combination with bisulfate ions, having a concentration from about 8.00 moles per liter to about 13.00 moles per liter of the solubility enhancing aqueous composition volume;

a cationic component comprising ammonium ions having a concentration from about 1.45 moles per liter to about 2.01 moles per liter of the solubility enhancing aqueous composition volume; and hydrogen ions in a concentration from about 17.38 mols per liter to about 21.68 moles per liter of the solubility enhancing aqueous composition volume;

wherein the domestic animal feed modifying composition comprises a domestic animal water modifying composition added to, applied to and/or blended with domestic animal feed or other substances fed to domestic animals;

wherein at least six ounces of a domestic animal water modifying composition is added to about five gallons of water provided to such domestic animal when water is the selected means of administration of such domestic animal water modifying composition;

wherein from about thirty ounces to about eighty ounces of a domestic animal feed modifying composition is added to about one ton of feed provided to such domestic animal when feed is the selected means of administration of such domestic animal feed modifying composition; and wherein such domestic animal is poultry.

4. A method for improving feed conversion ratios in domestic animals, comprising administering to such domestic animals a non-toxic amount of at least one composition selected from the group consisting of a domestic animal water modifying composition and a domestic animal feed modifying composition, compared to domestic animals not receiving such administration, wherein the domestic animal water modifying composition comprises:

about 4 percent to about 12 percent w/w solubility enhancing composition;

about 25 percent to about 40 percent w/w propylene glycol;

wherein the solubility enhancing composition comprises sulfate ions, alone or in combination with bisulfate ions, having a concentration from about 8.00 moles per liter to about 13.00 moles per liter of the solubility enhancing aqueous composition volume;

a cationic component comprising ammonium ions having a concentration from about 1.45 moles per liter to about 2.01 moles per liter of the solubility enhancing aqueous composition volume; and hydrogen ions in a concentration from about 17.38 mols per liter to about 21.68 moles per liter of the solubility enhancing aqueous composition volume;

wherein the domestic animal feed modifying composition comprises a domestic animal water modifying composition added to, applied to and/or blended with domestic animal feed or other substances fed to domestic animals;

wherein at least six ounces of a domestic animal water modifying composition is added to about five gallons of water provided to such domestic animal when water is the selected means of administration of such domestic animal water modifying composition; and wherein from about thirty ounces to about eighty ounces of a domestic animal feed modifying composition is added to about one ton of feed provided to such domestic animal when feed is the selected means of administration of such domestic animal feed modifying composition.

5. A method for reducing the grow-out period for domestic animals, comprising administering to such domestic animals a non-toxic amount of at least one composition selected from the group consisting of a domestic animal water modifying composition and a domestic animal feed modifying composition, compared to domestic animals not receiving such administration, wherein the domestic animal water modifying composition comprises:

about 4 percent to about 12 percent w/w solubility enhancing composition;

about 25 percent to about 40 percent w/w propylene glycol;

wherein the solubility enhancing composition comprises sulfate ions, alone or in combination with bisulfate ions, having a concentration from about 8.00 moles per liter to about 13.00 moles per liter of the solubility enhancing aqueous composition volume; a cationic component comprising ammonium ions having a concentration from about 1.45 moles per liter to about 2.01 moles per liter of the solubility enhancing aqueous composition volume;

hydrogen ions in a concentration from about 17.38 mols per liter to about 21.68 moles per liter of the solubility enhancing aqueous composition volume; and wherein the domestic animal feed modifying composition comprises a domestic animal water modifying composition added to, applied to and/or blended with domestic animal feed or other substances fed to domestic animals;

wherein at least six ounces of a domestic animal water modifying composition is added to about five gallons of water provided to such domestic animal when water is the selected means of administration of such domestic animal water modifying composition;

wherein from about thirty ounces to about eighty ounces of a domestic animal feed modifying composition is added to about one ton of feed provided to such domestic animal when feed is the selected means of administration of such domestic animal feed modifying composition; and wherein such domestic animal is poultry.

\* \* \* \* \*